US010262414B2

(12) United States Patent
Nitzken et al.

(10) Patent No.: US 10,262,414 B2
(45) Date of Patent: Apr. 16, 2019

(54) COMPUTER AIDED DIAGNOSTIC SYSTEM FOR MAPPING OF BRAIN IMAGES

(71) Applicant: University of Louisville Research Foundation, Inc., Louisville, KY (US)

(72) Inventors: Matthew J. Nitzken, Louisville, KY (US); Ayman S. El-Baz, Louisville, KY (US); Manuel F. Casanova, Simpsonville, SC (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 15/223,671

(22) Filed: Jul. 29, 2016

(65) Prior Publication Data
US 2017/0032520 A1     Feb. 2, 2017

Related U.S. Application Data

(60) Provisional application No. 62/198,169, filed on Jul. 29, 2015.

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/11* (2017.01); *G06T 7/33* (2017.01); *G06T 7/37* (2017.01);
(Continued)

(58) Field of Classification Search
CPC ......... G06T 2207/30016; G06T 7/0012; G06T 2207/10088; G06T 7/11; G06T 2200/04;
(Continued)

(56) References Cited

U.S. PATENT DOCUMENTS

2006/0013505 A1* 1/2006 Yau .................... G06K 9/00201
                                                      382/285
2007/0081701 A1* 4/2007 Sirohey ................ G06F 19/321
                                                      382/128
(Continued)

OTHER PUBLICATIONS

Boddaert, Nathalie, et al. "Superior temporal sulcus anatomical abnormalities in childhood autism: a voxel-based morphometry MRI study." Neuroimage 23.1 (2004): 364-369.*
(Continued)

*Primary Examiner* — Li Liu
(74) *Attorney, Agent, or Firm* — Bingham Greenebaum Doll LLP; Brian W. Chellgren; James C. Eaves, Jr.

(57) ABSTRACT

Systems, methods, and computer program products for classifying a brain are disclosed. An embodiment method includes processing image data to generate segmented image data of a brain cortex. The method further includes generating a statistical analysis of the brain based on a three dimensional (3D) model of the brain cortex generated from the segmented image data. The method further includes using the statistical analysis to classify the brain cortex and to identify the brain as being associated with a particular neurological condition. According to a further embodiment, generating the 3D model of the brain further includes registering a 3D volume associated with the model with a corresponding reference volume and generating a 3D mesh associated with the registered 3D volume. The method further includes generating the statistical analysis by analyzing individual mesh nodes of the registered 3D mesh based on a spherical harmonic shape analysis of the 3D model.

19 Claims, 5 Drawing Sheets
(3 of 5 Drawing Sheet(s) Filed in Color)

(51) Int. Cl.
  *G06T 7/33* (2017.01)
  *G06T 7/37* (2017.01)
  *G06T 7/11* (2017.01)
(52) U.S. Cl.
  CPC .............. *G06T 2207/10081* (2013.01); *G06T 2207/10088* (2013.01); *G06T 2207/20128* (2013.01); *G06T 2207/30016* (2013.01)
(58) Field of Classification Search
  CPC ......... G06K 2209/051; G06K 9/00214; G06K 9/6206; G06K 9/6232
  See application file for complete search history.

(56) References Cited

U.S. PATENT DOCUMENTS

| | | | | |
|---|---|---|---|---|
| 2008/0170791 | A1* | 7/2008 | Eskildsen | G06K 9/48 382/199 |
| 2010/0322496 | A1* | 12/2010 | Liu | G06T 19/00 382/131 |
| 2011/0044521 | A1* | 2/2011 | Tewfik | G06K 9/6206 382/131 |
| 2013/0259346 | A1* | 10/2013 | El-Baz | G06T 7/0012 382/131 |
| 2016/0225146 | A1* | 8/2016 | Frank | A61B 5/055 |
| 2017/0046833 | A1* | 2/2017 | Lurie | G06T 19/20 |
| 2018/0005455 | A1* | 1/2018 | Wenzel | G06T 19/20 |

OTHER PUBLICATIONS

Williams, Emily, et al. "Spherical harmonic analysis of cortical complexity in autism and dyslexia." Translational neuroscience 3.1 (2012): 36-40.*

Nitzken, Matthew, et al. "3D shape analysis of the brain cortex with application to dyslexia." Image Processing (ICIP), 2011 18th IEEE International Conference on. IEEE, 2011.*

Nitzken, Matthew Joseph. "Shape-based detection of cortex variability for more accurate discrimination between autistic and normal brains." (2010).*

* cited by examiner

COMPUTER AIDED DIAGNOSTIC SYSTEM FOR MAPPING OF BRAIN IMAGES

CROSS REFERENCE TO RELATED APPLICATION

Pursuant to 37 C.F.R. § 1.78(a)(4), this application claims the benefit of and priority to prior filed Provisional Application Ser. No. 62/198,169 filed Jul. 29, 2015, which is expressly incorporated herein by reference. This application is also related to U.S. Pat. No. 9,230,321 that issued on Jan. 5, 2016, the disclosure of which is expressly incorporated herein by reference.

FIELD OF THE INVENTION

This disclosure generally relates to computer analysis of medical image data, and in particular to the analysis of medical images of the brain and to the characterization of neurological conditions of the brain based on such analysis.

BACKGROUND OF THE INVENTION

With continuing improvements in medical imaging technology and computer processing systems, computer assisted analysis of medical imaging data is a growing technology area. In particular, analysis of medical images of a brain scan may assist in identifying and/or assessing neurological injuries and/or conditions. For example, a number of studies have indicated that structural differences may be found in brains of individuals of subjects exhibiting dyslexia, autism, and attention deficit/hyperactivity disorder (ADHD).

The neurological disorder of dyslexia, for example, is difficult to diagnose and has a profound impact on a child's ability to fluently read and comprehend words despite the fact that they possess a normal intelligence level for their age and education [1]. Dyslexia is not uncommon, as it affects roughly 5-12% of the population [2]. However, it is often diagnosed only after a child's scholastic performance or lifestyle has already been impacted.

According to multiple studies, structural differences are found in the brains of subjects with dyslexia. The earliest finding revealed a lack of the typical brain asymmetry and an increase in cortical anomalies [2]. According to Eliez et al. [3] and Casanova et al. [4], dyslexic subjects have smaller gyral indexes (the ratios between the pial contours and the convex hull of the brain surface) than normal subjects, suggesting that the dyslexic brains differ in folding. The recent comprehensive reviews by Richlan et al. [5] and Krafnick et al. [6] have demonstrated evidence of change in the bilateral temporoparietal and left occipitotemporal cortical regions of the brain's gray matter.

Using voxel-based morphometry to examine in-vivo dyslexic brains, Eliez et al. [3] and Silani et al. [7] have indicated reduced gray matter volume in such brains. Klingberg et al. [8] and Niogi et al. [9] also examined the cerebral white matter by using diffusion tensor imaging and found similar results. By analyzing MRIs, Elnakib et al. [10] and von Plessen et al. [11] discovered significant differences in the shapes and body length of the corpus callosum in key anatomical regions that help to identify dyslexia.

Advances in neuro-imaging provide some possibilities for non-invasive methods for automatic dyslexia and/or autism detection by revealing differences between quantitative characteristics of normal, autistic, and dyslexic brains. Studies have shown a relation between the cerebral white matter (CWM) volume and anatomy in dyslexic and autistic brains as compared with normal brains. Particularly, the CWM structural differences may generally be related to the volume of the CWM, where an autisic brain is reported as having a larger volume than a normal brain and a dyslexic brain is reported as having a smaller volume than a normal brain.

Some conventional computer aided diagnostic systems utilize a volumetric analysis to classify a brain as autistic or dyslexic. However, a volumetric approach fails to account for other factors including, for example, age, and gender. Thus, while volume has been linked to autism and dyslexia, computer aided analysis utilizing volume as a discriminating factor is not particularly accurate because of brain volume differences due to age and gender.

Therefore, a need continues to exist in the art for improved image processing techniques for use in analyzing medical images of the brain for the purposes of assessing neurological conditions of the brain.

SUMMARY OF THE INVENTION

The disclosed embodiments overcome drawbacks of conventional approaches by identifying characteristics of localized regions of the brain and determining correlations between localized brain features and neurological conditions of the brain.

Embodiments of the invention comprise systems, methods, and computer program products for generating a three dimensional mapping of a brain based on brain scan images of a medical imaging scan of the brain and to analysis of the brain based at least in part on the three dimensional mapping. The brain may be analyzed based on the three dimensional mesh map to evaluate neurological health of the brain, diagnose neurological conditions, and/or determine severity of neurological conditions.

According to an embodiment, systems and methods for classifying a brain are disclosed. An embodiment method includes processing image data to generate segmented image data of a brain cortex. The method further includes generating a statistical analysis of the brain based on a three dimensional (3D) model of the brain cortex generated from the segmented image data. The method further includes using the statistical analysis to classify the brain cortex and to identify the brain as being associated with a particular neurological condition.

According to a further embodiment, generating the 3D model of the brain further includes registering a 3D volume associated with the model with a corresponding reference volume and generating a 3D mesh associated with the registered 3D volume. The method further includes generating the statistical analysis by analyzing individual mesh nodes of the registered 3D mesh based on a spherical harmonic shape analysis of the 3D model.

According to a further embodiment, a computer-implemented system for classifying a brain is disclosed. The system includes at least one non-transitory computer readable storage medium, having computer program instructions stored thereon, and at least one processor. The processor is configured to execute the computer program instructions to thereby cause the processor to perform a number of operations leading to a classification of the brain. In a first operation, the processor receives brain scan images of a medical imaging scan of a brain and generates a three dimensional mesh map of the brain based at least in part on the brain scan images.

In a second operation, the processor spherically deforms the three dimensional mesh map of the brain to generate a deformed three dimensional mesh map of the brain. In a further operation, the processor determines a spherical harmonic shape analysis for the deformed three dimensional mesh map of the brain and determines at least one significant location for the brain based at least in part on the spherical harmonic shape analysis. In further operations, a neurological condition of the brain may be determined based on identification of one or more significant locations in the brain.

According to a further embodiment, a non-transitory computer readable storage medium having computer program instructions stored thereon is disclosed. The computer program instructions, when executed by a processor, cause the processor to perform a number operations leading to a classification of a brain. The operations include receiving brain scan images of a medical imaging scan of a brain, generating a three dimensional mesh map of the brain based at least in part on the brain scan images, and spherically deforming the three dimensional mesh map of the brain to generate a deformed three dimensional mesh map of the brain.

The operations further include determining a spherical harmonic shape analysis for the deformed three dimensional mesh map of the brain, and determining at least one significant location for the brain based at least in part on the spherical harmonic shape analysis. In further operations, a neurological condition of the brain may be determined based on identification of one or more significant locations in the brain.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements. The patent or application file contains at least one drawing executed in color. Copies of this patent or patent application publication with color drawing(s) will be provided by the Office upon request and payment of the necessary fee.

DETAILED DESCRIPTION

Embodiments of the invention comprise methods, systems, and computer program products for analyzing medical images (e.g., brain scan images) of a medical imaging scan. In some embodiments of the invention, medical images for a 3-dimensional magnetic resonance image (MRI) scan of a brain may be analyzed, and a three dimensional mesh map of the brain may be generated. Embodiments of the invention may analyze the brain based on the three dimensional mesh map to determine significant locations, to correlate significant locations with diagnoses, and/or to determine severity of a condition. Further details regarding the techniques described herein are provided in M. Nitzken, M. F. Casanova, G. Gimel'farb, and A. El-Baz, "Spherical Harmonic Mapping of Dyslexia", which is incorporated by reference in its entirety. Further related disclosure may be found in U.S. Pat. No. 9,230,321 that issued on Jan. 5, 2016, which is also incorporated herein by reference.

Reference in this specification to "one embodiment," "an embodiment," an "example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one of ordinary skill in the relevant art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those of ordinary skill in the relevant art with access to the teachings provided herein will recognize additional modifications, applications, and embodiments within the scope thereof and additional fields in which embodiments would be of significant utility. Therefore, the detailed description is not meant to limit the embodiments described below.

The disclosed embodiments focus on the cerebral cortex of the brain and provide a new framework for mapping the brain in order to explore differences of brains having various neurological conditions relative to neurotypical (i.e., "normal") brains.

Figure 1:
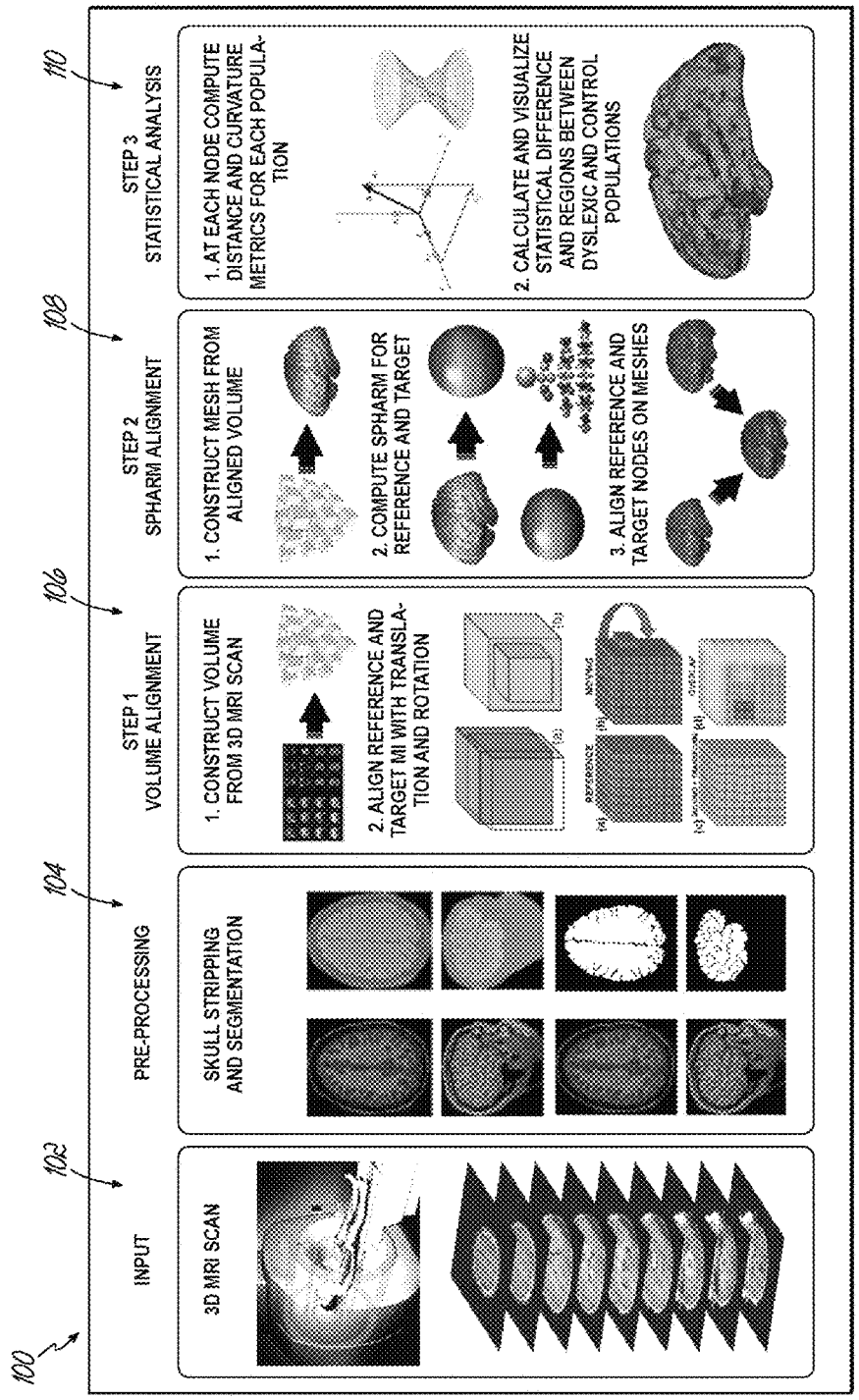
FIG. 1 is a block diagram illustrating various image processing steps for analyzing brain scan images and classifying a brain based on such analysis, according to an embodiment.

FIG. 1 is a block diagram illustrating various image processing steps for analyzing brain scan images and classifying a brain based on such analysis, according to an embodiment. Starting with three-dimensional (3D) brain scan images 102, the disclosed framework performs the following image processing steps: 3D brain cortex segmentation 104; registration of the segmented 3D volume to a reference atlas volume 106; construction of a 3D Delaunay triangulation mesh and 3D Spherical Harmonics (SPHARM) decomposition and registration of the mesh 108; and statistical analysis of individual mesh nodes across the brain's surface 110. The above-referenced image processing steps are described in greater detail below.

Brain Cortex Segmentation

Accurate cortex segmentation from 3D T1-MRI scans is a challenging problem because of similar pixel-wise image intensities in both the cortex and the surrounding organs. As a solution, the disclosed embodiments employ a known parametric deformable 3D boundary evolution process, which is controlled with three probabilistic models, namely, a first-order visual appearance, a learned shape prior, and a spatial second-order model of the volume to be segmented, as described in greater detail in the incorporated references mentioned above. As noted in U.S. Pat. No. 9,230,321, further processing of the scan images takes place. For example, a skull stripping and segmentation step 104 may be used to pre-process the scan images for volume alignment spherical harmonic processing.

3D Volume Registration

In order to accurately examine the brain surface, the target brain volumes are aligned to a reference volume using geometric transformations (e.g., rigid Euclidean movements) selected by unconstrained optimization of a nonlinear fitness function as noted in step 106 in FIG. 1. The latter combines two weighed terms depending on relative spatial (x, y, z)-translations and rotations (denoted below θ) of a target 3D volume with respect to a reference. Scaling and shearing, which result in erroneous brain shape distortions, are excluded from the transformations.

The fitness terms evaluate the alignment by the relative 3D mutual information (MI) and voxel overlap between the volumes. The MI (see, e.g., [13]) is computed between distance maps for the reference and target volumes, each map being formed by the Multi-Stencils Fast Marching Method [14]. The relative 3D MI is as follows:

$$E_{mi}(\theta) = \frac{M_{tar}(\theta)}{M_{max}}, \qquad \text{Eq. (1)}$$

wherein $M_{tar}(\theta)$ and $M_{max}$ are the MI between the transformed target and reference, and the maximal MI between the reference and itself, respectively.

The relative voxel overlap is calculated as:

$$E_{voxel}(\theta) = 1 - \frac{\sum_{(i,j,k)=(1,1,1)}^{(I,J,K)} |V_{tar}(i,j,k;\theta) - V_{ref}(i,j,k)|}{\sum_{(i,j,k)=(1,1,1)}^{(I,J,K)} V_{ref}(i,j,k)}, \qquad \text{Eq. (2)}$$

wherein $V_{ref}(i, j, k)$ and $V_{tar}(i, j, k; \theta)$ denote binary voxel values indicating the presence (1) or absence (0) of the reference and transformed target volumes, respectively, within their common 3D voxel space of the size I×J×K.

The weighted fitness function $F_{fit}(\theta)$ to be maximized is then:

$$F_{fit}(\theta) = w_{mi} E_{mi}(\theta) + w_{voxel} E_{voxel}(\theta), \qquad \text{Eq. (3)}$$

wherein $w_{mi}$ and $w_{voxel}$ are pre-selected fixed weights (in experiments related to disclosed embodiments, $w_{mi} = w_{voxel} = 0.5$ assuming equal contributions of both the terms).

The unconstrained nonlinear maximization of the function in Eq. (3) implements a search for the translations and rotations, $\theta^* = \arg\max_\theta F_{fit}(\theta)$, of a target volume, aligning it closely to the reference volume. According to an embodiment, an iterative block-coordinate descent optimization may be used to circumvent the complicated and time-consuming simultaneous optimization of the six translation-rotation parameters. The block-coordinate optimization toggles between the translation and rotation, repeating the cycles until convergence is achieved (i.e. until no further changes of the parameters $\theta^*$ are found).

Spherical Harmonics (SPHARM) Shape Analysis

According to an embodiment, a representation using Spherical Harmonics (SPHARM) enables a great simplification of the process of surface registration to locate point-to-point correspondences, relative to the more difficult process of establishing correspondences manually or finding such correspondences analytically. The spectral SPHARM analysis [15, 16] considers a 3D surface as a linear combination of specific basis functions, as noted in step 108 of FIG. 1. To perform a SPHARM based comparison, a surface manifold of the brain cortex for both the reference and target volumes is approximated with a triangulated 3D Delaunay mesh [17] consisting of 50,000 individual nodes to ensure high surface accuracy. Unit spheres for each manifold are constructed by organizing the mesh nodes in line with two properties of the "Attraction-Repulsion" mapping [18]: (i) the unit distance of each node from the brain cortex center and (ii) the equal distances of each node from its nearest neighbors, as discussed, for example, in U.S. Pat. No. 9,230,321.

In this analysis, $\Omega$ is used to denote a pair of polar and azimuthal spherical angles related to a 3D point on the cortical surface supported by the unit sphere. The target, T, and reference, R, meshes consist each of n nodes: $T = \{t(\Omega_i) : i=1, \ldots, n\}$ and $R = \{r(\Omega_i'): i=1, \ldots, n\}$, wherein $t(\Omega_i) = [x_t(\Omega_i), y_t(\Omega_i), z_t(\Omega_i)]$ and $r(\Omega_i') = [x_r(\Omega_i'), y_r(\Omega_i'), z_r(\Omega_i')]$ denote the 3D (x, y, z)-coordinates of the mesh nodes of the target and reference meshes, respectively. These target and reference nodes relate to their own, and generally unrelated, spherical angles $\{\Omega_i: i=1, \ldots, n\}$ and $\{\Omega_i': i=1, \ldots, n\}$, respectively. The spherical harmonics are computer for the reference and target.

The SPHARMs, $Y_{lm}(\Omega)$, of degree 1; $l=0, 1, \ldots, k$, and order m; $-l \le m \le l$, form a set of the orthonormal functions on the sphere [15]. The orthonormality holds with respect to the inner product, $(f, \varphi)$, of the arbitrary functions, $f(\Omega)$ and $\varphi(\Omega)$, supported by the sphere. Weighted k-degree SPHARM approximations, $T_{ap}$ and $R_{ap}$, of the target and reference surfaces, respectively are defined as follows [20]:

$$t_{ap}(\Omega) = \Sigma_{l=0}^k \Sigma_{m=-l}^l w_l b_{lm} Y_{lm}(\Omega) = \Sigma_{l=0}^k \Sigma_{m=-l}^l w_l b'_{lm} Y_{lm}(\Omega), \qquad \text{Eq.(4)}$$

wherein a smoothing degree-dependent weight, $w_l = e^{-l(l+1)\sigma}$; $\sigma > 0$, is selected empirically to reduce Gibbs ringing artifacts in these approximate surfaces and the vectorial SPHARM coefficients, $b_{lm} = [<x_t, Y_{lm}>, <y_t, Y_{lm}>, <z_t, Y_{lm}>]$ and $b_{lm}' = [<x_t', Y_{lm}>, <y_t', Y_{lm}>, <z_t', Y_{lm}>]$ are computed on the basis of the target, T and reference, R, mesh nodes and SPHARM functions $Y_{lm}(\Omega)$.

The reference and target nodes are aligned on the meshes. The approximation of Eq. (4) maps the target surface to the reference mesh, which can be used for exploring sulcal and gyral folding patterns [19]. The mapping preserves the target shape and curvature and relates them to the reference nodes by interpolating, if necessary, between the neighboring mapped target nodes.

Statistical Metrics for Brain Mapping

For each node, distance and curvature metrics are calculated as noted in step 110. Each node of the target mesh following the 3D volume and SPHARM registration may be characterized with four statistical metrics, namely, the Euclidean distance from the origin and the Gaussian, mean, and normal surface curvatures [21]. Statistical differences and regions between a control group and a population having a particular neurological condition may be calculated and visualized. Statistical node-wise p-values between the brain meshes for a control group and for populations having abnormal neurological conditions may be computed using an unpaired t-test at the 95% significance level.

The proposed processing of the invention and framework has been examined using in-vivo data collected from 30 age-matched subjects (16 dyslexic and 14 control ones of age from 18 to 40 years in each group). The subjects were scanned with a 1.5 Tesla GE Mill system with voxel resolution of 0.9375×0.9375×1.5 mm 3 under a $T_1$ weighted imaging sequence protocol. The reference brain was constructed from the Montreal Neurological Institute's ICBM 152 atlas [22, 23]. All results are displayed as overlays on the reference brain.

Figure 2:
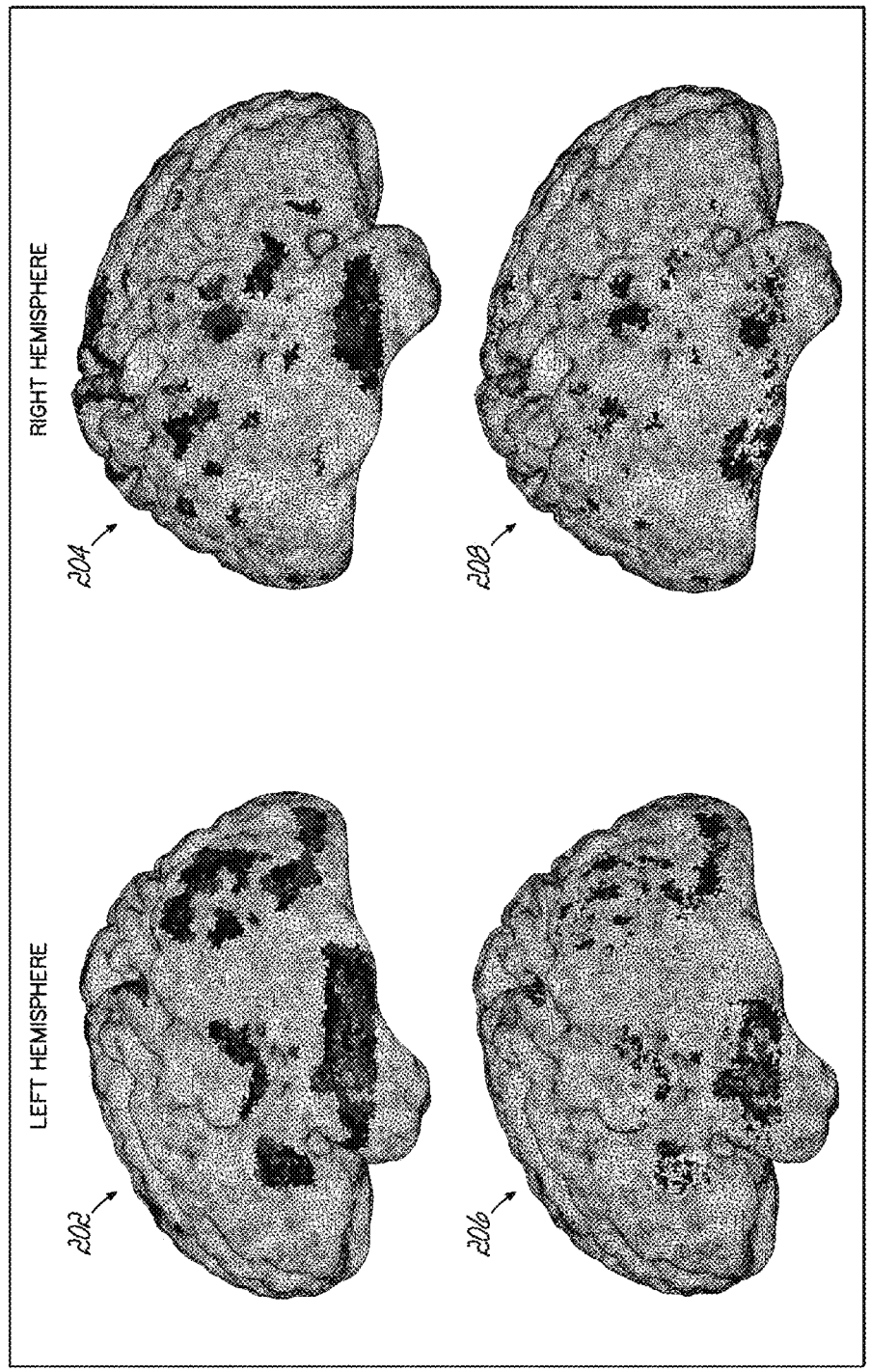
FIG. 2 is a schematic illustration of computed p-values at each node of a three dimensional mesh, highlighting detected areas of significant differences on the brain surface of a dyslexic brain relative to a control population as quantified using the disclosed image processing framework, according to an embodiment.

FIG. 2 is a schematic illustration 200 of computed p-values at each node, highlighting detected areas of significant differences on the brain surface of a dyslexic brain relative to a control population as quantified using the disclosed image processing framework, according to an embodiment. According to an embodiment of the invention, significant areas may be identified as Brodmann Areas, as would be readily appreciated by persons of ordinary skill in the art. The brightness of the illustrated node color corresponds to the statistical significance of the node, with brighter node colors indicating more significant nodes relative to nodes having less-bright colors.

For better clarity, in FIG. 2, nodes having p-values below the statistical significance threshold are indicated using a uniform background color. In this regard, brain nodes with statistically significant differences (p<0.05) in the measured distance or curvature (202 and 204), and nodes significant differences in both the distance and curvature (206 and 208). Insignificant nodes are shown as white; otherwise the brighter the color, the more significant the node (i.e. the darkest nodes have the least significance).

Figure 3:
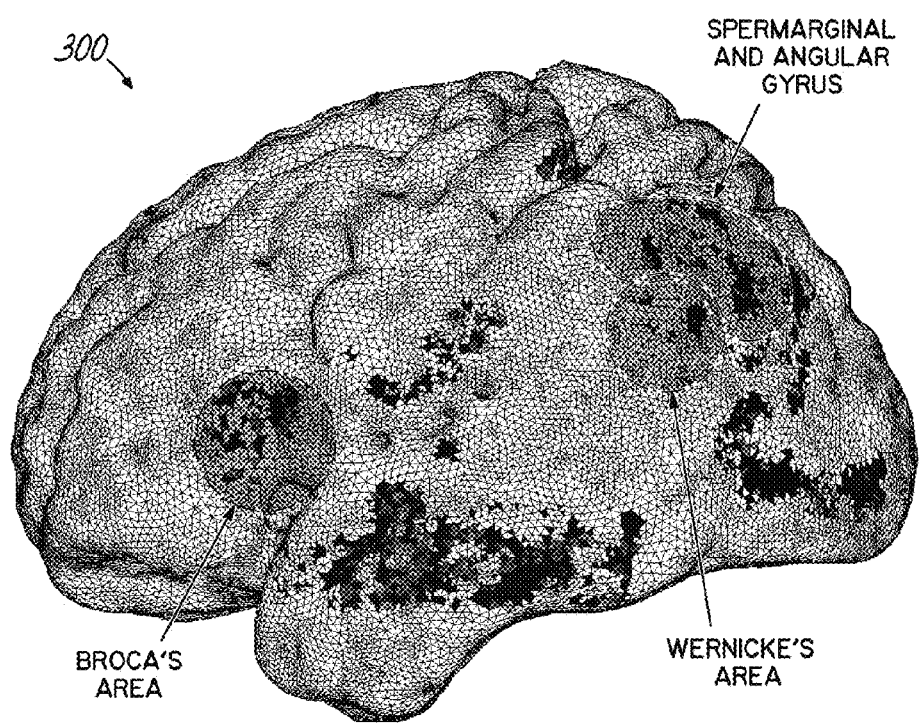
FIG. 3 is a schematic illustration in which key areas of the brain are overlaid on a brain map of significant differences, demonstrating that significant areas indicated by the disclosed image processing framework include key areas found in conventional brain studies, according to an embodiment.

By visual comparisons, results obtained with the disclosed image processing framework confirm other known brain studies, for example, studies by Richlan et al. [5, 24], Krafnick et al. [6], and Talan et al. [25], who have highlighted key brain areas widely recognized as related to phonological processing and dyslexia, as illustrated in greater detail, for example, in FIG. 3.

In accordance with another aspect of the invention, a brain map noting key areas is used in combination with areas that have statistical significance, according to the invention: FIG. 3 is a schematic illustration 300 in which key areas of the brain are overlaid on a brain map of statistically significant differences, demonstrating that significant areas indicated by the disclosed image processing framework include key areas found in conventional brain studies, according to an embodiment. In this regard, results generated from an independent data set provide clear evidence that supports Richlan [5, 24] and Krafnick's [6] recommendations for identifying specific locations of the most prominent differences between the dyslexic and control subjects. FIG. 3 illustrates, as one example, the uniquely colored Broca's and Wernicke's areas, as well as the supermarginal and angular gyms on the left brain hemisphere together with areas of statistically significant difference in both distance and curvature measurements. In the illustrated example significantly different nodes are found in brain areas that correlate with phonological processing. According to an embodiment of the invention, significant areas may be correlated with identified Brodmann Areas. Such Brodmann areas as shown in FIG. 3 are known areas associated with the architecture of the brain that correlate to various cortical functions. In the instant invention, as illustrated in FIG. 3, certain Brodmann may be mapped with or overlaid on the brain map image showing the statistically significant differences as calculated using the invention.

Such mapping provides a readily understood visual indication of whether certain Bordmann areas, that may be associated with neurological conditions, also coincide with measured statistically significant differences that may reflect the nurological conditions. FIG. 3 only shows some Brodmann areas, but others may be used as well.

The brain cortex is typically divided into four lobes: frontal, parietal, occipital, and temporal. To make the measurements more detailed, the frontal lobe can be subdivided into the prefrontal and premotor areas. As shown in Table 1, below, the absolute numbers of the significantly different nodes or their relative numbers (percentages of the total brain nodes) can easily be counted for each of above-referenced five brain areas.

That the temporal and parietal lobes contain major areas of difference arises because the key areas associated with language processing reside in these brain lobes. Nonetheless, the proposed mapping provides potentially useful quantitative characteristics and more precise locations of the areas of the key dyslexic-to-normal brain differences. Furthermore the disclosed approach reveals significantly different areas that neighbor these key primary phonological processing areas. A potential reason for the occurrence of these differences may be related to migrations in brain function, wherein alternate parts of the brain work to help compensate in dyslexic individuals, as proposed in a new theory by Talan et al. [25].

TABLE 1

| Brain Region | Left Hemisphere | | Right Hemisphere | |
| --- | --- | --- | --- | --- |
| | $N_{sd}$ | $V_{sd}$, % | $N_{sd}$ | $V_{sd}$, % |
| Prefrontal | 0 | 0 | 0 | 0 |
| Premotor | 309 | 0.6 | 547 | 1.1 |
| Parietal | 939 | 1.8 | 1073 | 2.1 |
| Occipital | 706 | 1.4 | 185 | 0.3 |
| Temporal | 734 | 1.4 | 478 | 0.9 |
| Totals | 2688 | 5.3 | 2283 | 4.5 |

Table 1 presents numbers $N_{sd}$ and relative numbers $v_{sd}$ (% of the total nodes) of significantly different nodes in the primary prefrontal, premotor, parietal, occipital, and temporal brain regions. Therefore, in accordance with another aspect of the invention, a quantitative measurement of statistically significant different nodes is tracked and correlated to one or more sections or lobes of the brain cortex. This provides a metric that reflects more precise locations of the areas of key brain differences from normal that are linked to certain nurological issues (e.g., dyslexia). Such a metric may reflect differences not only in expected brain regions but also in alternative regions.

In one embodiment, dyslexic target brains are analyzed in accordance with the invention. The disclosed framework examines statistical differences across the surface of brains between dyslexic and control populations. Combining a volumetric registration with a SPHARM alignment enables detailed comparison of individual positions on the surface of the brain. Parameters, such as distance and curvature, as calculated and statistically analyzed, indicate that there are differences between dyslexic and control subjects. It was found that the results of the disclosed invention indicate differences in areas of the brain that correspond to predictions by Richlan et al. [5, 24] and Krafnick et al [6]. While differences were detected in expected brain regions, the disclosed invention also located additional differences in neighboring and alternative brain regions.

These findings are promising and suggest that they may shed light on neurological disorders, include mapping individual brain structures, to help isolate key differences useful for understanding the development of the human brain. The proposed brain mapping framework, of the invention, demonstrates understanding and improves diagnostic clinical information available to physicians.

Figure 4:
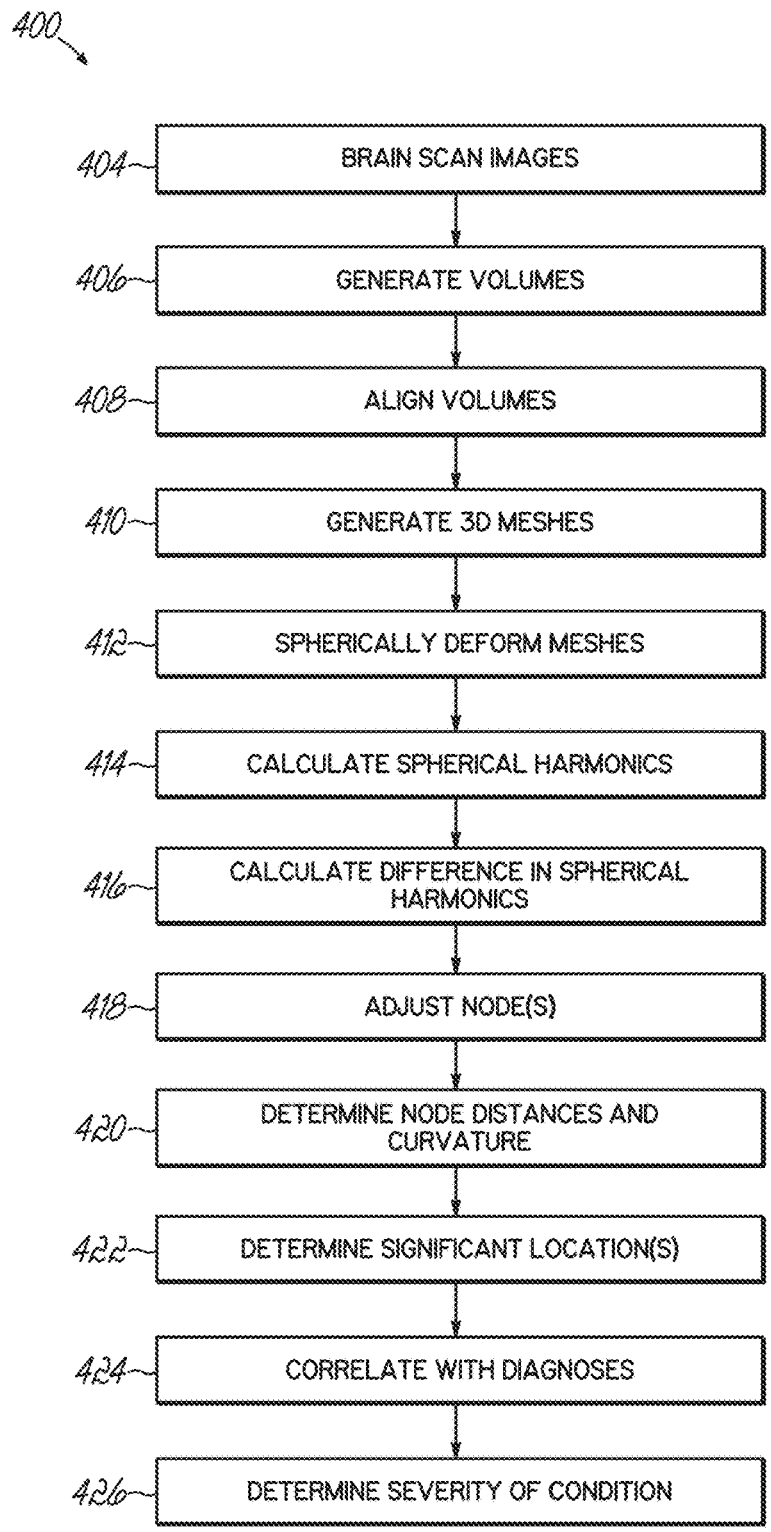
FIG. 4 is a flow chart illustrating an exemplary automated process for generating a three dimensional mesh map of a brain based on brain scan images of the brain and analysis thereof, according to an embodiment of the invention.

FIG. 4 is a flow chart illustrating an exemplary automated process 400 for generating a three dimensional mesh map of a brain based on brain scan images 404 of the brain and analysis thereof, according to an embodiment of the invention. Consistent with embodiments of the invention, two distinct sets of brain scan images, known as target images and reference images may be utilized. Using the brain scan images, volumes are generated. For example, the images for the target and reference are loaded into memory such that they each occupy an array of logical values that constitute a virtual 3D volume—a target volume and a reference volume, respectively 406. In some embodiments, the difference between the volumes is determined. In this regard, the first occurrence of a pixel in the X, Y and Z direction is determined. The difference between these pixels is referred to as the NATURAL OFFSET of the images.

Each volume, reference and target, may be cleaned for inconsistencies. In general, cleaning the images comprises cycling through each image in the volume, such that the images are examined along the z-axis, or from the first to last image. When each image is accessed the image is processed for connectivity and 2-dimensional (2D) holes are removed from the image. The cleaned image may be re-inserted into the volume. After iterating through all images, the volume may be scanned. When a pixel is found to not be a part of the logical volume (i.e., does not have a value of 1 or true) the pixel may be examined in the X, Y and Z directions for potential neighbors. If the pixel is found to be surrounded by neighbors then this is determined to be a 3D hole, and the value may be replaced with a value of 1 or true. Again, the volume is cycled through, such that images are examined along the z-axis, or from the first to last image.

When each image is accessed the edges of the object may be examined and an edge consisting of 1 pixel may be removed from around the objects contained in each image. The cleaned images may then be re-inserted into the volume. Next the volume may be examined and all border pixels are removed such that there is a buffer having size of 1 pixel consisting of zeros surrounding the volume. Then this buffer may be uniformly increased such that the volume is surrounded by a buffer of 15 pixels consisting of zeros. This allows for each volume to rotate and translate without exceeding the boundaries of the volume.

After cleaning the volumes, the volumes may be aligned, as set forth in step 408. According to an embodiment of the invention, a distance map of the reference volume may be calculated. The 3D edges are determined for the volume and saved into a volume such that the volume consists of primarily the value of zero, and an edge of the volume is represented by the value of 1. A distance map of the volume may be calculated, where such distance may be calculated based on the Fast Marching Method for 3D volumes. This distance map may then be inverted by multiplying all values by −1.

To align the two volumes, a minimum boundary constrained search may be performed. To do this a lower and upper boundary may be constructed such that the volume cannot rotate or expand more than a minimum and maximum amount. Additionally the minimum boundary search may be performed in sequence, such that parameters of translation, scaling, shearing, and rotation are optimized in order, which may expedite the alignment process.

For each parameter, a minimum boundary search may comprise: randomly selecting a value within the upper and lower boundary for a parameter; transforming the target volume using an affine transformation altered by the random value; and determining 3D edges for the transformed target volume; and saving into a volume such that the volume consists of primarily the value of zero, and an edge of the volume is represented by the value of 1.

A distance map of the volume may be calculated, where such calculation may be based at least in part on the Fast Marching Method for 3D volumes. The distance map may be inverted by multiplying all values by -1. The maximum value between the distance map for the target and the reference may then be calculated. Using the two distance maps, a joint histogram may be computed between the transformed target and the reference volumes. A fitness may be calculated for the volume. If the fitness is lower than a previous random value, then it is accepted as the new best fit. This process may be performed for a set number of times until the fitness is minimized for a parameter. The initial transformation matrix may be updated and the following parameter is optimized. This process may be repeated until change is minimal for all 4 parameters and ensures that the volumes are adequately aligned with one another.

Once the volumes are aligned with one another, a 3D mesh map may be generated for the transformed target volume and the reference volume according to step 410. According to an embodiment, the volumes may be converted to 3D Delaunay Meshes. The resulting mesh may then be corrected for scanner scaling to ensure the physiological accuracy of the meshes. Next the meshes may be checked to ensure that all nodes and faces are properly formed. In the event of improper nodes and faces, the improper nodes and faces are corrected such that they are valid for the mesh.

After constructing each mesh, a spherical deformation of each mesh is performed per step 412. According to an embodiment, spherical deformation may be based at least in part on an Attraction-Repulsion algorithm that may deform the mesh to a unit sphere. Therefore, for each volume, the reference volume and transformed target volume, an original mesh and spherical mesh may be determined. Using the spherical mesh, the spherical harmonics for each volume may be calculated per step 414. Using these harmonics, differences between each set of harmonics may be calculated per step 416. Using this difference, the nodes for the transformed target mesh may be adjusted such that they fall in the same angular locations as the nodes in the reference mesh per step 418. In this way, all of the nodes for each mesh are aligned in the same angular location, while preserving the unique shape of each mesh.

At each node, the distance from the origin and the Gaussian geodesic curvature may be calculated per step 420, as discussed above. For example, statistically significantly different nodes are determined. Taking a substantially large group of two distinct classes of brains, the distances and geodesic curvatures for each node may be calculated for the groups. Comparing the values at each node allows for statistically significant locations in the brain (referred to as significant locations) to be determined per step 422. For example, autistic and control brains may be analyzed. Similarly, dyslexic and control brains may be analyzed. In further embodiments, other neurological conditions may addressed as well. Based on the analysis, nodes that show a significant difference between normal and test brains may be located.

Furthermore, as part of the location determination, different maps of the brain may be used to correlate with the significant locations (e.g., Brodmann areas) in order to make a diagnosis. A quantitative metric of the number of statistically significant different nodes might be correlated to brain areas as well.

The analysis may then be extended by correlating the statistically different nodes with unique individual diagnoses per step 424. The result is that specific conditions associated with autism, dyslexia, and/or other such neurological conditions may be associated with unique locations in the brain, based on the processing and statistically different node locations as determined by the invention.

Further analysis may be performed to gauge the severity of a condition in an individual per step 426. To compute the severity of a condition, the regions of known significant difference between populations may be examined. In these areas, the quantitative number of different nodes for a subject may be computed. Based on the percentage difference in the individual subject, relative to the total amount of difference, the severity may be determined. Such analysis may be extended by using probability density functions to weight each node on a sliding scale.

In this regard, the brain (shape) map may facilitate two distinct populations to be compared to one another. In these populations, significant differences can be located based on brain mesh maps (e.g., based on represented shapes). Significant locations may be identified with individual disorders and specific conditions. Further, when brain mesh maps of new subjects are compared against a diagnosed and/or reference brain mesh map, the percent of correspondence between the subject brain mesh map and the reference brain mesh map can be used to determine the severity of the condition.

Figure 5:
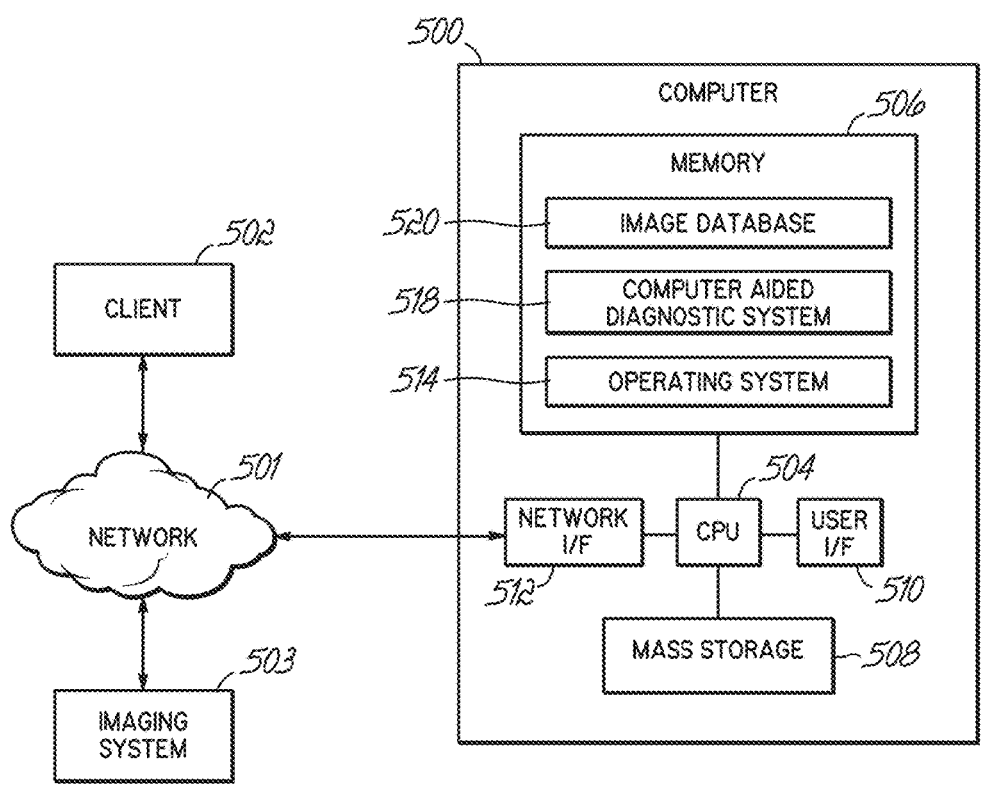
FIG. 5 illustrates an exemplary apparatus within which various operations associated with the disclosed image processing framework may be implemented, according to an embodiment.

FIG. 5 illustrates an exemplary apparatus 500 within which various operations associated with the disclosed image processing framework may be implemented, according to an embodiment. For example, one or more steps in process 400 may be implemented in an automated fashion, utilizing a computer or other electronic device, such as apparatus 500.

Apparatus 500 in the illustrated embodiment is implemented as a server or multi-user computer that is coupled via a network 501 to one or more client computers 502, as well as an imaging system 503, e.g., a magnetic resonance imaging (MRI) scanner. For the purposes of the invention, each computer 500, 502 may represent practically any type of computer, computer system or other programmable electronic device. Moreover, each computer 500, 502 may be implemented using one or more networked computers, e.g., in a cluster or other distributed computing system. In the alternative, computer 500 may be implemented within a single computer or other programmable electronic device, for example, within a desktop computer, a laptop computer, a handheld computer, a cell phone, a set top box, etc.

Computer 500 typically includes a central processing unit 504 including at least one microprocessor coupled to a memory 506, which may represent the random access memory (RAM) devices comprising the main storage of computer 500, as well as any supplemental levels of memory, e.g., cache memories, non-volatile or backup memories (e.g., programmable or flash memories), read-only memories, etc. In addition, memory 506 may be considered to include memory storage physically located elsewhere in computer 500, e.g., any cache memory in a processor in CPU 504, as well as any storage capacity used as a virtual memory, e.g., as stored on a mass storage device 508 or on another computer coupled to computer 500.

Computer 500 also typically receives a number of inputs and outputs for communicating information externally. For interface with a user or operator, computer 500 typically includes a user interface 510 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 500 may also include one or more mass storage devices 508, e.g., a floppy or other removable disk drive, a hard disk drive, a direct access storage device (DASD), an optical drive (e.g., a CD drive, a DVD drive, etc.), and/or a tape drive, among others. Furthermore, computer 500 may include an interface 512 with one or more networks 501 (e.g., a LAN, a WAN, a wireless network, and/or the Internet, among others) to permit the communication of information with other computers and electronic devices. It should be appreciated that computer 500 typically includes suitable analog and/or digital interfaces between CPU 504 and each of components 506, 508, 510 and 512 as is well known in the art. Other hardware environments are contemplated within the context of the invention.

Computer 500 operates under the control of an operating system 514 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 500 via network 501, for example, in a distributed or client-server computing environment, whereby the processing required to implement the functions of a computer program may be allocated to multiple computers over a network.

As an example, computer 500 may include a computer aided diagnostic (CAD) system program 518 used to implement one or more of the steps described above in connection with process 400. For the purposes of implementing such steps, an image database 520, storing MRI head scan images, may be implemented in computer 500. It will be appreciated, however, that some steps in process 400 may be performed manually and with or without the use of computer 500.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable storage media include but are not limited to physical, tangible storage media such as volatile and non-volatile memory devices, floppy and other removable disks, hard disk drives, magnetic tape, optical disks (e.g., CD-ROMs, DVDs, etc.), among others.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Embodiments may be implemented using software, hardware, and/or operating system implementations other than those described herein. Any software, hardware, and operating system implementations suitable for performing the functions described herein can be utilized. Embodiments are applicable to both a client and to a server or a combination of both.

CONCLUSION

The Summary and Abstract sections may set forth one or more but not all example embodiments and thus are not intended to limit the scope of embodiments of the invention and the appended claims in any way.

Embodiments have been described above with the aid of functional building blocks illustrating the implementation of specified functions and relationships thereof The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the invention that others can, by applying knowledge of those of ordinary skill in the art, readily modify and/or adapt for various applications such specific embodiments, without undue experimentation, without departing from the general concept of embodiments of the invention. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the invention should not be limited by any of the above-described example embodiments, but should be defined only in accordance with the following claims and their equivalents.

REFERENCES

1. K. R. Pugh, W. E. Mend, et al., "Functional neuroimaging studies of reading and reading disability (developmental dyslexia)," Mental Retardation and Developmental Disabilities Research Reviews, vol. 6, no. 3, pp. 207-213, 2000.
2. G. Lyon, S. Shaywitz, et al., "A definition of dyslexia," Annals of Dyslexia, vol. 53, no. 1, pp. 1-14, 2003.
3. S. Eliez, J. M. Rumsey, et al., "Morphological alteration of temporal lobe gray Matter in dyslexia: an MRI study," Journal of Child Psychology and Psychiatry, vol. 41, no. 5, pp. 637-644, 2000.
4. M. F. Casanova, J. Araque, et al., "Reduced brain size and gyrification in the brains of dyslexic patients," Journal of Child Neurology, vol. 19, no. 4, pp. 275-281, 2004.
5. F. Richlan, M. Kronbichler, et al., "Structural abnormalities in the dyslexic brain: A meta-analysis of voxel-based morphometry studies," Human Brain Mapping, vol. 34, no. 11, pp. 3055-3065, 2013.
6. A. J. Krafnick, D. L. Flowers, et al., "An investigation into the origin of anatomical differences in dyslexia," The Journal of Neuroscience, vol. 34, no. 3, pp. 901-908, 2014.
7. G. Silani, U. Frith, et al., "Brain abnormalities underlying altered activation in dyslexia: a voxel based morphometry study," Brain, vol. 128, no. 10, pp. 2453-2461, 2005.
8. T. Klingberg, M. Hedehus, et al., "Microstructure of temporo-parietal white matter as a basis for reading ability: evidence from diffusion tensor magnetic resonance imaging," Neuron, vol. 25, no. 2, pp. 493-500, 2000.
9. S. N. Niogi and B. D. McCandliss, "Left lateralized white matter microstructure accounts for individual differences in reading ability and disability," Neuropsychologia, vol. 44, no. 11, pp. 2178-2188, 2006.
10. A. Elnakib, A. El-Baz, et al., "Image-based detection of corpus callosum variability for more accurate discrimination between dyslexic and normal brains," in2010 IEEE International Symposium on Biomedical Imaging: From Nano to Macro (ISBI' 10). IEEE, 2010, pp. 109-112.
11. K. von Plessen, A. Lundervold, et al., "Less developed corpus callosum in dyslexic subjects a structural Mill study," Neuropsychologia, vol. 40, no. 7, pp. 1035-1044, 2002.
12. A. Alansary, A. Soliman*, F. Khalifa*, A. Elnakib*, M. Mostapha*, M. Nitzken*, M. Casanova, and A. El-Baz, "MAP-Based Framework for Segmentation of MR Brain Images Based on Visual Appearance and Prior Shape," *MIDAS Journal*, vol. 1, pp. 1-13, October 2013. Available: http://hdl.handle.net/10380/3440.
13. C. E. Shannon, "A mathematical theory of communication," ACM SIGMOBILE Mobile Computing and Communications Review, vol. 5, no. 1, pp. 3-55, 2001.
14. M. S. Hassouna and A. A. Farag, "Multistencils fast marching methods: A highly accurate solution to the eikonal equation on cartesian domains," IEEE Transactions on Pattern Analysis and Machine Intelligence, vol. 29, no. 9, pp. 1563-1574, 2007.
15. G. Gerig, M. Styner, et al., "Shape analysis of brain ventricles using spharm," in IEEE Workshop on Mathematical Methods in Biomedical Image Analysis (MMBIA 2001). IEEE, 2001, pp. 171-178.
16. M. K. Chung, K. M. Dalton, et al., "Weighted Fourier series representation and its application to quantifying the amount of gray matter," IEEE Transactions on Medical Imaging, vol. 26, no. 4, pp. 566-581, 2007.
17. Q. Fang and D. A. Boas, "Tetrahedral mesh generation from volumetric binary and grayscale images," in IEEE International Symposium on Biomedical Imaging: From Nano to Macro (ISBI'09). IEEE, 2009, pp. 1142-1145.

18. M. Nitzken, M. Casanova, G. Gimel'farb, F. Khalifa*, A. Elnakib*, A. Switala, and A. El-Baz, "3D Shape Analysis of the Brain Cortex with Application to Autism," Proc. of *IEEE International Symposium on Biomedical Imaging: From Nano to Macro (ISBI'11)*, Chicago Ill., USA, Mar. 30-Apr. 2, 2011, pp. 1847-1850.
19. M. K. Chung, R. Hartley, et al., "Encoding cortical surface by spherical harmonics," Statistica Sinica, vol. 18, no. 4, p. 1269, 2008.
20. M. K. Chung, K. M. Dalton, et al., "Tensor-based cortical surface morphometry via weighted spherical harmonic representation," IEEE Transactions on Medical Imaging, vol. 27, no. 8, pp. 1143-1151, 2008.
21. E. Abbena, S. Salamon, et al., Modern Differential Geometry of Curves and Surfaces with Mathematica. CRC press, 2006.
22. V. S. Fonov, A. C. Evans, et al., "Unbiased average age-appropriate atlases for pediatric studies," NeuroImage, vol. 54, no. 1, pp. 313-327, 2011.
23. "Unbiased nonlinear average age-appropriate brain templates from birth to adulthood," NeuroImage, vol. 47, p. S102, 2009.
24. F. Richlan, M. Kronbichler, et al., "Functional abnormalities in the dyslexic brain: A quantitative meta-analysis of neuroimaging studies," Human Brain Mapping, vol. 30, no. 10, pp. 3299-3308, 2009.
25. J. Talan, "A new theory and brain areas implicated to explain dyslexia," Neurology Today, vol. 14, no. 3, pp. 12-13, 2014.

What is claimed is:

1. A processor implemented method for classifying a brain, the method comprising:
   receiving brain scan images of a medical imaging scan of the brain;
   generating a first three dimensional mesh of the brain based at least in part on the brain scan images, the first three dimensional mesh including a first plurality of nodes;
   aligning each of the first plurality of nodes of the first three dimensional mesh with a corresponding node of a second three dimensional mesh of a reference volume based at least in part on a spherical harmonic shape analysis of the first and second three dimensional meshes;
   identifying one or more nodes of the first plurality of nodes that show a significant difference in at least one of a distance from an origin or geodesic curvature from one or more corresponding nodes of the second three dimensional mesh of the reference volume; and
   determining at least one significant location for the brain based at least in part on the one or more identified nodes of the first plurality of nodes.

2. The method of claim 1, further comprising identifying characteristics of localized regions of the brain based at least in part on the at least one significant location.

3. The method of claim 2, further comprising identifying the localized regions as Brodmann areas.

4. The method of claim 3, further comprising:
   comparing characteristics of the identified Brodmann areas with characteristics of corresponding Brodmann areas of a reference brain to determine localized differences between the brain and the reference brain; and
   classifying the brain based at least in part on the localized differences.

5. The method of claim 1, further comprising classifying the brain as being indicative of autism based at least in part on the at least one significant location.

6. The method of claim 1, further comprising classifying the brain as being indicative of dyslexia based at least in part on the at least one significant location.

7. The method of claim 1, further comprising classifying the brain as being indicative of attention-deficit/hyperactivity disorder (ADHD) based at least in part on the at least one significant location.

8. The method of claim 1, wherein identifying the one or more nodes of the first plurality of nodes comprises computing at least one of the distance or the geodesic curvature for each node of the first plurality of nodes.

9. The method of claim 8, wherein computing the at least one of the distance or the geodesic curvature comprises computing at least one of: (1) a Euclidean distance of the node from an origin, (2) a Gaussian surface curvature, (3) a mean surface curvature, and (4) a normal surface curvature.

10. The method of claim 1, wherein identifying the one or more nodes of the first plurality of nodes comprises computing statistical node-wise p-values using an unpaired t-test to characterize differences in the at least one of the distance or the geodesic curvature.

11. The method of claim 10, further comprising computing statistical node-wise p-values using an unpaired t-test at a 95% significance level.

12. The method of claim 10, further comprising classifying the brain as being indicative of autism, dyslexia, and/or ADHD when localized regions of the brain are identified as having a statistically significant difference from a reference brain.

13. The method of claim 1, further comprising classifying the brain by identifying nodes having statistically significant differences from corresponding nodes of a reference brain, wherein classifying the brain comprises identifying numbers of the nodes that reside in the left or right hemisphere of one or more of the following brain regions: (1) prefrontal, (2) premotor, (3) parietal, (4) occipital, and (5) temporal.

14. A non-transitory computer readable storage medium having computer program instructions stored thereon that, when executed by a processor, cause the processor to perform the following operations:
   receiving brain scan images of a medical imaging scan of a brain;
   generating a first three dimensional mesh of the brain based at least in part on the brain scan images, the first three dimensional mesh including a first plurality of nodes;
   aligning each of the first plurality of nodes of the first three dimensional mesh with a corresponding node of a second three dimensional mesh of a reference volume based at least in part on a spherical harmonic shape analysis of the first and second three dimensional meshes;
   identifying one or more nodes of the first plurality of nodes that show a significant difference in at least one of a distance from an origin or geodesic curvature from one or more corresponding nodes of the second three dimensional mesh of the reference volume; and
   determining at least one significant location for the brain based at least in part on the one or more identified nodes of the first plurality of nodes.

15. The non-transitory computer readable storage medium of claim 14, further comprising instructions that cause the processor to identify the brain as being associated with a particular neurological condition based at least in part on the at least one significant location.

16. The non-transitory computer readable storage medium of claim 15, further comprising instructions that cause the processor to determine a severity of the particular neurological condition based at least in part on the at least one significant location.

17. A computer-implemented system for classifying a brain, the system comprising:
   at least one non-transitory computer readable storage medium having computer program instructions stored thereon;
   at least one processor that is configured to execute the computer program instructions causing the at least one processor to perform the following operations:
   receiving brain scan images of a medical imaging scan of the brain;
   generating a first three dimensional mesh of the brain based at least in part on the brain scan images, the first three dimensional mesh including a first plurality of nodes;
   aligning each of the first plurality of nodes of the first three dimensional mesh with a corresponding node of a second three dimensional mesh of a reference volume based at least in part on a spherical harmonic shape analysis of the first and second three dimensional meshes;
   identifying one or more nodes of the first plurality of nodes that show a significant difference in at least one of a distance from an origin or geodesic curvature from one or more corresponding nodes of the second three dimensional mesh of the reference volume; and
   determining at least one significant location for the brain based at least in part on the one or more identified nodes of the first plurality of nodes.

18. The computer-implemented system of claim 17, further comprising computer program instructions that cause the at least one processor to perform the following operation:
   generating a target volume based on the brain scan images,
   wherein generating the first three dimensional mesh of the brain is based at least in part on the target volume.

19. The computer-implemented system of claim 18, further comprising computer program instructions that cause the at least one processor to perform the following operations:
   generating the reference volume based on reference brain scan images;
   generating the second three dimensional mesh based at least in part on the reference volume; and
   calculating differences in spherical harmonics of the first three dimensional mesh of the brain and the second three dimensional mesh of the reference volume,
   wherein determining the at least one significant location for the brain is based at least in part on the differences in spherical harmonics.

* * * * *